(12) United States Patent
Yang et al.

(10) Patent No.: US 7,911,556 B2
(45) Date of Patent: Mar. 22, 2011

(54) BACKLIGHT MODULE HAVING REPLACEABLE LAMP MODULE

(75) Inventors: Chi-chun Yang, Hsin-Chu (TW);
Tung-liang Shao, Hsin-Chu (TW);
Ye-hen Chien, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 12/691,718

(22) Filed: Jan. 21, 2010

(65) Prior Publication Data

US 2010/0118517 A1    May 13, 2010

Related U.S. Application Data

(62) Division of application No. 11/622,794, filed on Jan. 12, 2007, now Pat. No. 7,688,396.

(30) Foreign Application Priority Data

Jul. 20, 2006    (TW) ............................... 95126599 A

(51) Int. Cl.
*G02F 1/1333* (2006.01)
(52) U.S. Cl. ................ 349/58; 349/65; 349/70; 349/67; 362/633; 362/614; 362/609
(58) Field of Classification Search ............... 349/65, 349/58, 67, 70, 69; 362/97.1, 611, 612, 614, 362/609, 632, 633, 634
See application file for complete search history.

(56) References Cited

U.S. PATENT DOCUMENTS

| 6,545,732 B2 * | 4/2003 | Nakano ........................... 349/58 |
| 7,325,963 B2 | 2/2008 | Chang et al. |
| 2002/0085391 A1 | 7/2002 | Sun et al. |

* cited by examiner

*Primary Examiner* — Thoi V Duong

(57) ABSTRACT

A backlight module having replaceable lamp module is provided. The backlight module includes a replaceable lamp module, a light-guiding plate, a frame and a positioning and protecting mechanism. The light-guiding plate is disposed over the bottom surface among four sides of the frame, wherein one side of the light-guiding plate and a corresponding side of the frame form a sliding groove. The replaceable lamp module is set in the sliding groove and slidably along the sliding groove. The positioning and protecting mechanism comprises a protecting device set on the replaceable lamp module and a positioning device set on the frame. The protecting device is capable of forming a gap between the replaceable lamp module and the bottom of the sliding groove in order to protect the replaceable lamp module from scraped by the structures of the backlight module while the replaceable lamp module is inserting into the sliding groove. The protecting device and the positioning device are capable of positioning and holding the replaceable lamp module in the sliding groove while the replaceable lamp module reaches the predetermined position in the backlight module, and meantime the gap is disappeared.

12 Claims, 6 Drawing Sheets

BACKLIGHT MODULE HAVING REPLACEABLE LAMP MODULE

CROSS REFERENCE TO RELATED APPLICATION

This is a division of a U.S. patent application Ser. No. 11/622,794, filed on Jan. 12, 2007 now U.S. Pat. No. 7,688,396.

FIELD OF THE INVENTION

The present invention relates to a backlight module having replaceable lamp module, and more particularly, to a mechanism for positioning and protecting the replaceable lamp module of backlight module used in a liquid crystal display (LCD).

BACKGROUND OF THE INVENTION

A backlight module is an optical device for providing a backlight source in a LCD product. A conventional backlight module includes a light source, a light-guiding plate, an optical film, and a plastic frame. The backlight source can be realized as an electro-luminescence (EL) device, a cold cathode fluorescent lamp (CCFL) device or a light emitting diode (LED) device.

The EL device and LED device are usually used in small-sized and mono-color (green or red lights) LCD products. Although some LCD products use white light (panchromatic) EL device or LCD device as backlight source, the LCD products with EL device or LCD device are only small-sized LCD (e.g. cellular phone, PDA, Gameboy) because the illuminations of EL device and LCD device are lower than which of the CCFL device. Therefore, the large-sized LCD products commonly use the CCFL device as white light backlight source due to the higher reliability and stability.

U.S. Pat. No. 5,815,227 discloses a backlight device used in a LCD. The backlight device comprises a light-inducing plate installed on the bottom surface of the LCD, a lamp installed on one side portion of light-inducing plate, and a lamp cover enclosing a part of the outer circumferential surface of lamp for reflecting the light from the LCD to light-inducing plate, wherein the light-inducing plate and lamp cover are directly coupled with each other by a locking structure. The locking structure is comprised of a locking protrusion formed on at least one of the upper and bottom surfaces of light-inducing plate and a locking hole in a corresponding portion of lamp cover. The lamp is fixed by locking the corresponding locking protrusions and locking holes.

U.S. Pat. No. 5,280,372 discloses a back light device built in a compact LCD device. The back light device comprises a light transmitting plate disposed behind a liquid crystal element, a light source disposed in the vicinity of one end of the light transmitting plate, a reflector for reflecting light from the light source towards the light transmitting plate, and a frame for supporting the backlight device. The light source may use a cold cathode tube (CCFT). Both ends of the light source are protected by a resinous protection member. The light source is supplied electric power through a corresponding lead wire and connector.

The light source and the reflector construct a side-slidably light source unit. The backlight device comprises a slide mechanism. The slide mechanism includes a guide rail fitted to an end of the frame. One end of the guide rail is made open so that the reflector is slidably along the guide rail. Therefore, a failure CCFT can be replaced by detaching the light source unit through the slide mechanism. The light source unit can be installed back to the backlight device after replacing with a new CCFT.

In the aforementioned conventional arts, the light source unit only comprises the mechanism for fixing light source without a positioning structure. The light source is easily tilted without the positioning structure so that the optical performance is degraded.

Furthermore, there is a need to replace the failure lamp or tube in the backlight device of LCD. The lead wire and a fixed tape for fixing the lead wire are easily scraped by the frame or back panel of LCD so that a Hi-Pot test will be failed or the fixed tape will be rolled.

SUMMARY OF THE INVENTION

It is an object of the present invention to provide a backlight module having replaceable lamp module. The backlight module having the replaceable lamp module is capable of positioning and protecting the replaceable lamp module of backlight module used in a LCD.

The backlight module comprises a replaceable lamp module, a light-guiding plate, a frame and a positioning and protecting mechanism. The frame comprises a bottom surface and four sides. The light-guiding plate is disposed over the bottom surface among four sides of the frame, wherein one side of the light-guiding plate and a corresponding side of the frame form a sliding groove. The replaceable lamp module is set in the sliding groove and slidably along the sliding groove. The positioning and protecting mechanism comprises a protecting device set on the replaceable lamp module and a positioning device set on the frame. The protecting device is capable of forming a gap between the replaceable lamp module and the bottom of the sliding groove in order to protect the replaceable lamp module from scraped by the structures of the backlight module while the replaceable lamp module is inserting into the sliding groove. The protecting device and the positioning device are capable of positioning and holding the replaceable lamp module in the sliding groove while the replaceable lamp module reaches the predetermined position in the backlight module, and meantime the gap is disappeared.

The replaceable lamp module includes a lamp having two opposite electrodes, a first bushing and a second bushings respectively enveloping the electrodes of the lamp, a reflecting plate enclosing a part of the lamp, and a fixed tape for fixing a lead wire on the reflecting plate.

The protecting device is set on two opposite sides of the reflecting plate and protruded to the outside of the fixed tape. The protecting device comprises a first protrusion and a second protrusion which are respectively protruded from two longitudinally opposite sides of the reflecting plate. The first and second protrusions have a thickness greater than the thickness of the fixed tape. The positioning device comprises a first indentation and a second indentation which are respectively coupled to the first and second protrusions. The first and second indentations can comprise holes or openings.

The first protrusion is inserted into the sliding groove before the second protrusion while the replaceable lamp module is inserting into the sliding groove. The first and second protrusions are respectively entered into the first and second indentations while the replaceable lamp module reaches the predetermined position in the backlight module.

The sliding groove is formed with a push-in structure which is set on the inner side of the sliding groove up the first indentation. The push-in structure presses the first bushing downward when the replaceable lamp module is inserting in the sliding groove and approaching the first indentation. Furthermore, the first bushing is continuously pressed by the push-in structure. The push-in structure may be a slope structure. The first and second bushings may be made of rubber or other elastic materials.

The first and second protrusions according to the present invention are also capable of forming a gap for protecting the fixed tape and the lead wire from scraped by the structures of the backlight module. The replaceable lamp module in accordance with the present invention can be positioned and fixed in the backlight module as long as the replaceable lamp module reaches the predetermined position in the backlight module.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENTS

Figure 1:
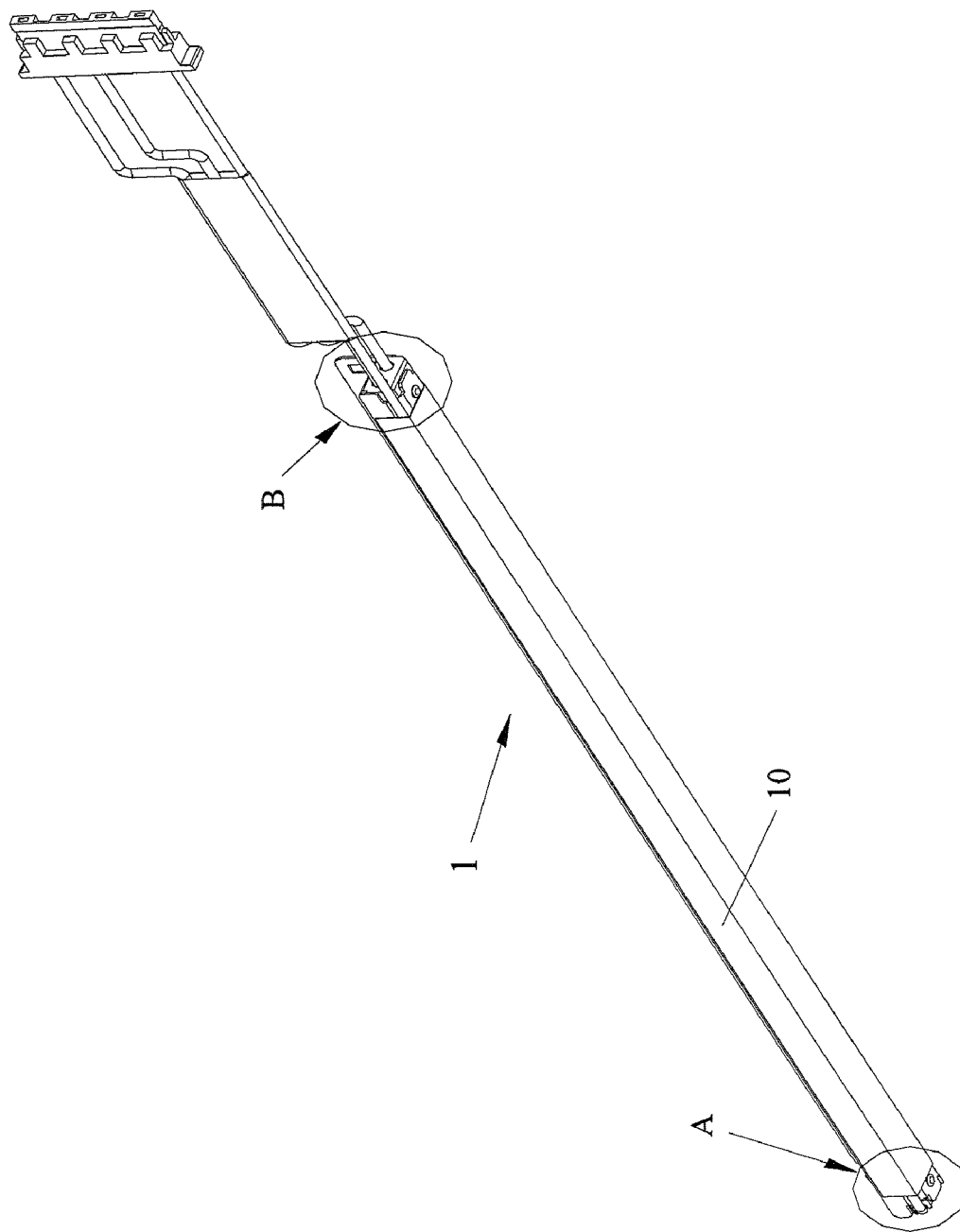
FIG. 1 is a perspective view illustrating a structure of the replaceable lamp module in accordance with the present invention.
Figure 2A:
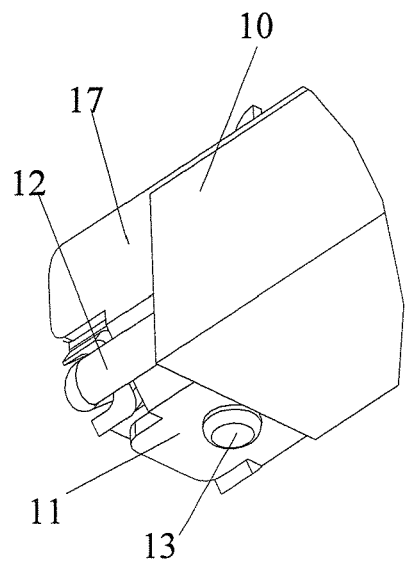
FIGS. 2a and 2b are the magnified views respectively corresponded to area A and area B in FIG. 1.
Figure 2B:
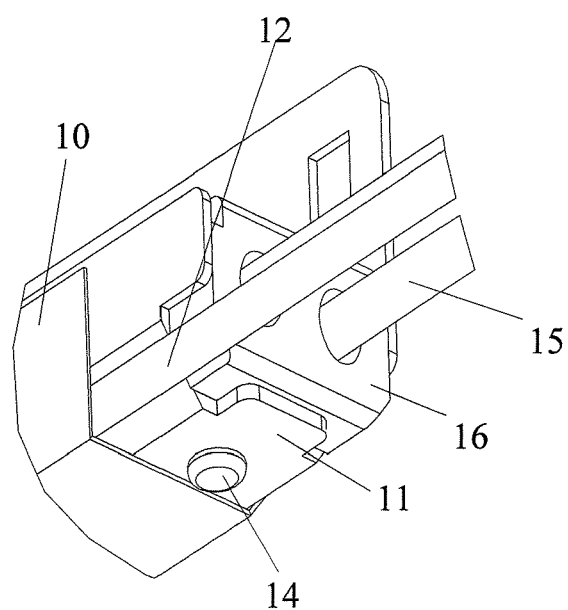

Referring to FIG. 1, FIG. 2a, FIG. 2b and FIG. 3, wherein FIGS. 2a and 2b are the magnified views respectively corresponded to area A and area B in FIG. 1. The backlight module 2 of the present invention comprises a replaceable lamp module 1, a light-guiding plate 24, a frame 20 and a positioning and protecting mechanism (not labeled). The positioning and protecting mechanism comprises a protecting device (not labeled) set on the replaceable lamp module 1 and a positioning device (not labeled) set on the backlight module 2. The replaceable lamp module 1 includes a lamp (not shown), a lead wire 12, an outside wire 15, a reflecting plate 11 and a fixed tape 10 for fixing the lead wire 12. The lamp comprises two electrodes connected with the lead wire 12 and outside wire 15 respectively. The frame 20 includes a bottom surface and four sides. The light-guiding plate 24 is disposed over the bottom surface among four sides of the frame 20, and one side of the light-guiding plate 24 and a corresponding side of the frame 20 form a sliding groove 25. The replaceable lamp module 1 is set in the sliding groove 25 and slidably along the sliding groove 25. The reflecting plate 11 is set in the inner side of the fixed tape 10 and closed to the fixed tape 10. The reflecting plate 11 encloses a part of the lamp. The protecting device is set on two opposite sides of the replaceable lamp module 1. The fixed tape 10 is capable of reducing the friction between the backlight module 2 and the replaceable lamp module 1 while replacing the replaceable lamp module 1.

Figure 3:
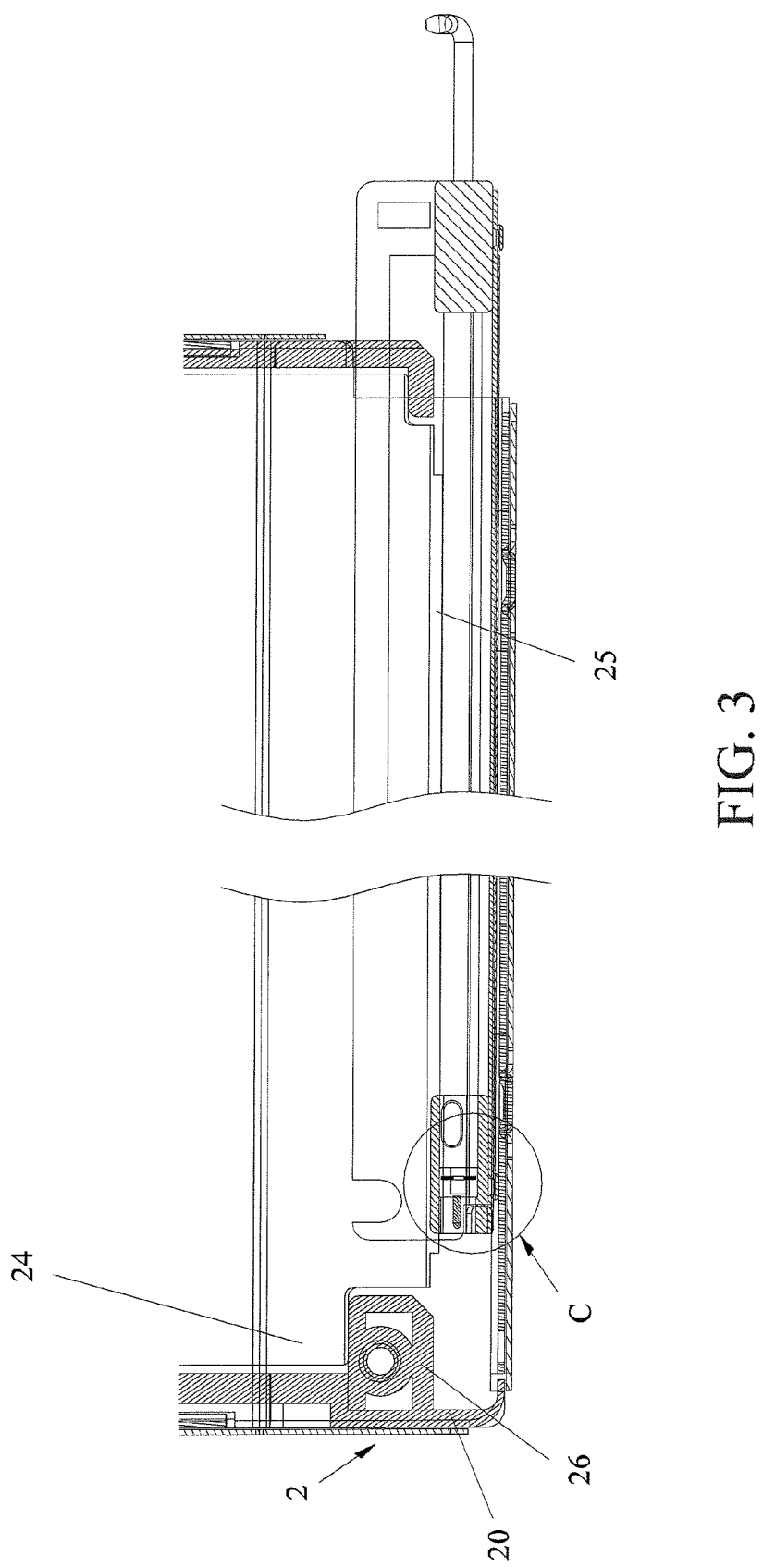
FIG. 3 is a schematic diagram illustrating the replaceable lamp module inserted into the sliding groove.
Figure 4:
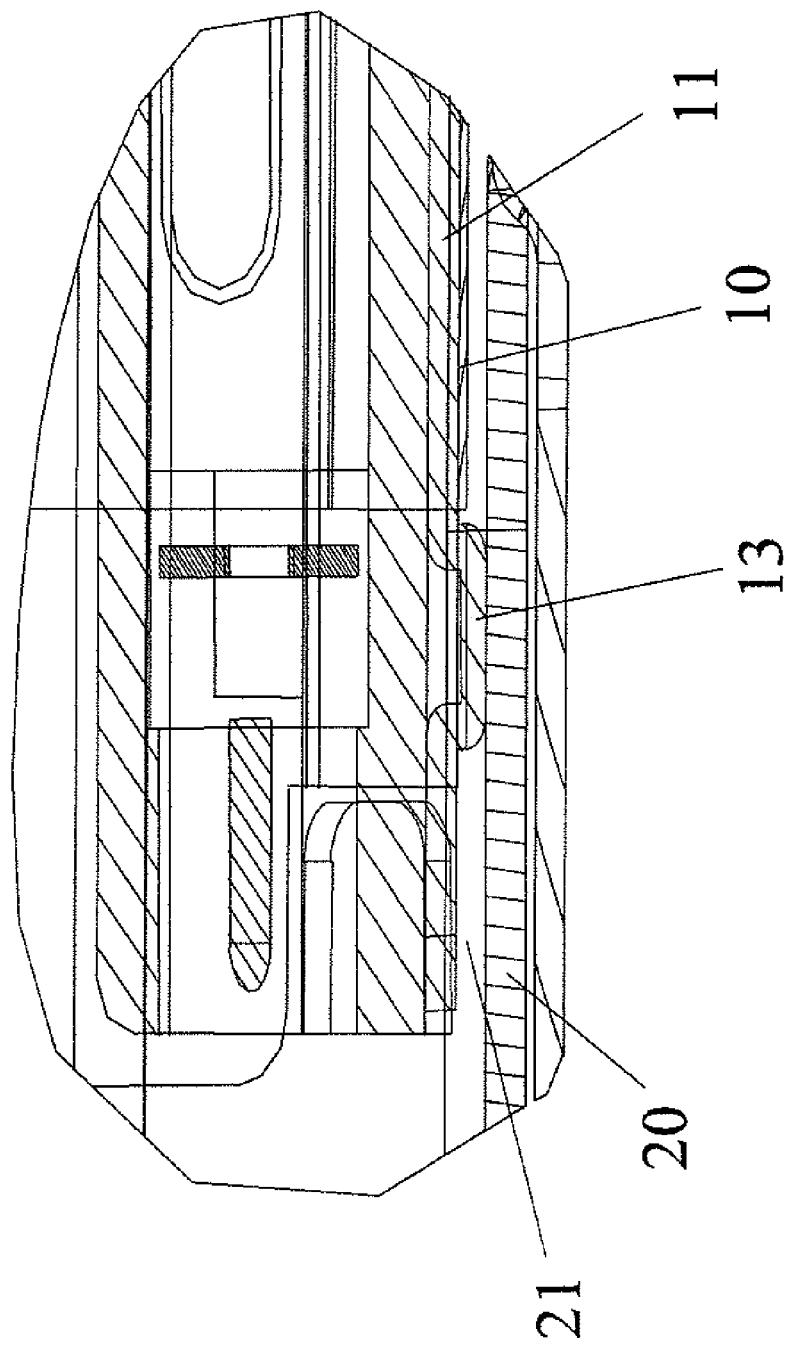
FIG. 4 is the magnified view corresponded to area C in FIG. 3.

FIG. 4 is a magnified view corresponded to the area C in FIG. 3. The protecting device is capable of maintaining a gap 21 between the fixed tape 10 and corresponding inner side surface of the sliding groove 25 (i.e. the corresponding inner side of frame 20). Accordingly, the fixed tape 10 and the lead wire 12 of the replaceable lamp module 1 can be protected from scraped by the inner side surface of the sliding groove 25.

The protecting device and the positioning device are coupled with each other for positioning the replaceable lamp module 1 to a predetermined position in the sliding groove 25 of the backlight module 2 while inserting the replaceable lamp module 1. In the meantime, the gap 21 between the fixed tape 10 and corresponding inner side surface of the sliding groove 25 will be disappeared, then the fixed tape 10 is closed to the corresponding inner side surface of the sliding groove 25.

The protecting device is set on two opposite sides of the reflecting plate 11 of the replaceable lamp module 1 and protruded to the outside of the fixed tape 10. The protecting device comprises a first protrusion 13 and a second protrusion 14 which are respectively protruded from two longitudinally opposite sides of the reflecting plate 11. The first and second protrusions 13, 14 have a thickness greater than the thickness of the fixed tape.

Figure 5:
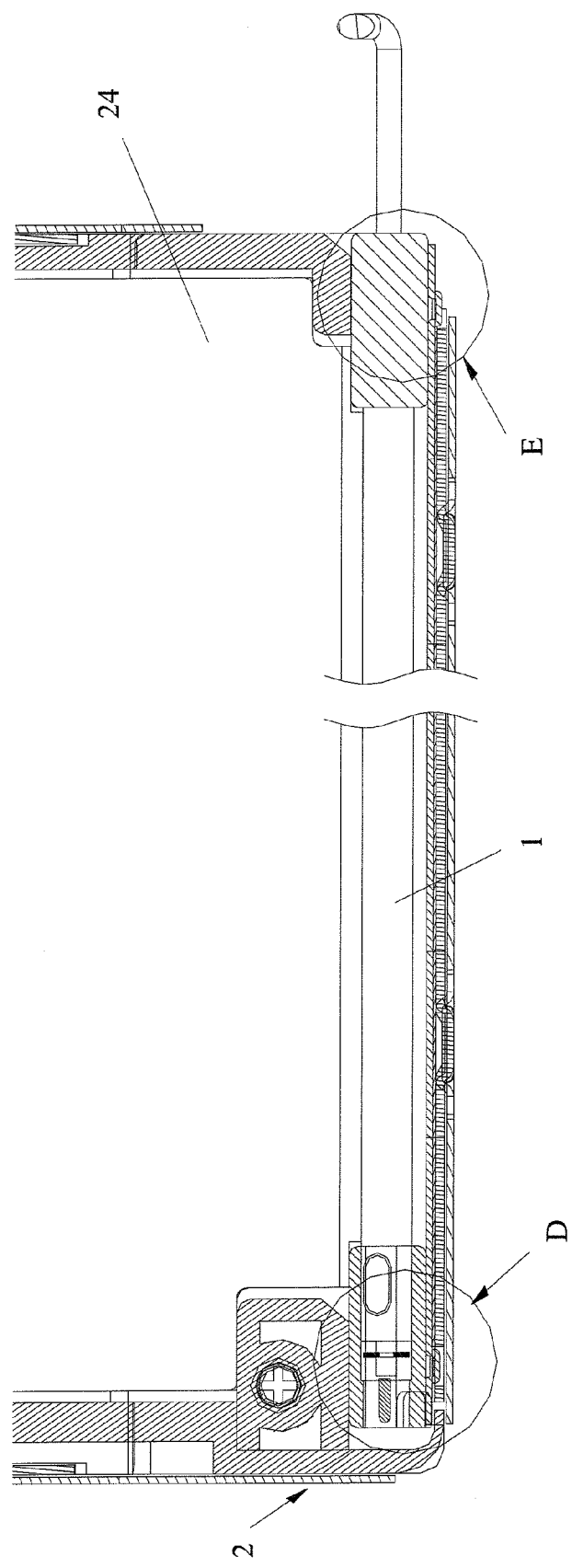
FIG. 5 is a cross-section view of the backlight module in accordance with the present invention.
Figure 6A:
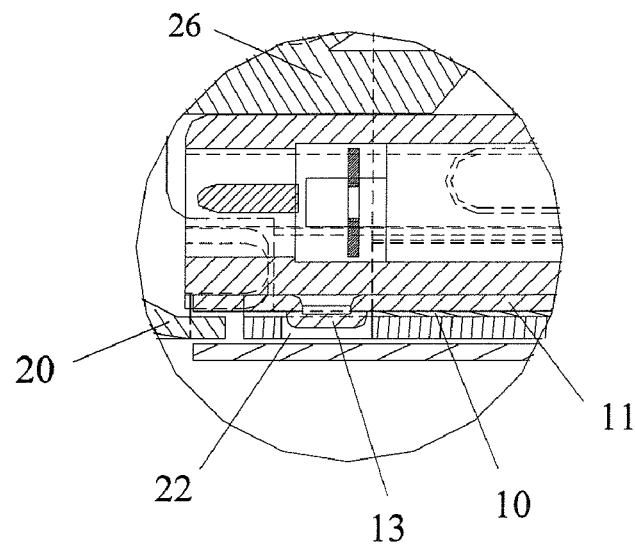
FIGS. 6a and 6b are the magnified views respectively corresponded to area D and area E in FIG. 5.
Figure 6B:
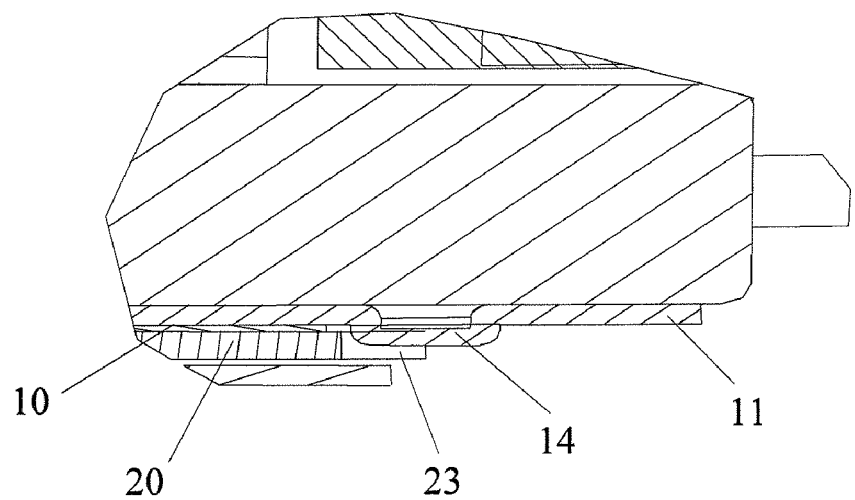

Please refer to FIG. 5, FIGS. 6a and 6b, wherein FIG. 5 is a cross-section view of the backlight module 2 and FIGS. 6a and 6b are the magnified views respectively corresponded to area D and area E in FIG. 5. The area D and area E in FIG. 5 indicate two opposite sides of the backlight module 2.

The positioning device is set on the frame 20 of the backlight module 2, corresponding to the positions of the first and second protrusions 13, 14 of the protecting device. The positioning device comprises a first indentation 22 and a second indentation 23 which are respectively coupled to the first and second protrusions 13, 14. The first and second indentations 22, 23 can be replaced by holes or openings.

The two opposite ends of the replaceable lamp module 1 are respectively installed with a first bushing 17 and a second bushing 16. The first and second bushings 17, 16 are carried by the reflecting plate 11. The first and second bushings 17, 16 are elastic and capable of holding the lamp. The first and second bushings 17, 16 are capable of enveloping the electrodes on two ends of lamp and holding two ends of lamp which are connected with the lead wire 12 or the outside wire 15. The first and second bushings 17, 16 of the replaceable lamp module 1 may be made of rubber or other elastic materials.

The sliding groove 25 is formed with a push-in structure 26 which is set on the inner side of the sliding groove 25 up the first indentation 22. The push-in structure 26 may be a slope structure. The push-in structure 26 presses the first bushing 17 downward when the replaceable lamp module 1 is inserting in the sliding groove 25 and approaching the first indentation 22. The first and second protrusions 13, 14 are respectively entered into the first and second indentations 22, 23 while the replaceable lamp module 1 reaches the predetermined position in the backlight module 2. Furthermore, the first bushing 17 is continuously pressed by the push-in structure 26 and the second bushing 16 is held by the corresponding portion of frame 20. Accordingly, the replaceable lamp module 1 can be fixed in the predetermined position of the backlight module 2.

Referring to FIG. 3 and FIG. 4 again, the first protrusion 13 is inserted into the sliding groove 25 of the backlight module 2 before the second protrusion 14. In the meantime, the gap 21 is formed between the fixed tape 10 and the frame 20 of the backlight module 2. Further referring to FIG. 5, FIGS. 6a and 6b, the first and second protrusions 13, 14 are respectively entered into the first and second indentations 22, 23 while the replaceable lamp module 1 reaches the predetermined position in the backlight module 2, and meantime the gap 21 is disappeared. Accordingly, the fixed tape 10 contacts with the frame 20 of the backlight module 2, that is, the fixed tape 10 contacts with the corresponding inner wall of the sliding groove 25.

The replaceable lamp module of present invention can be positioned by the first and second protrusions 13, 14 corresponded to the first and second indentations 22, 23. The first and second protrusions 13, 14 are also capable of raising the replaceable lamp module 1 from the bottom of the sliding groove 25 in order to protect the fixed tape 10 and the lead wire 12 from scraped by the structures of the backlight module 2. Finally, the first and second protrusions 13, 14 are respectively entered into the first and second indentations 22, 23 while the replaceable lamp module 1 reaches the predetermined position in the backlight module 2. Accordingly, the replaceable lamp module 1 is fixed in the backlight module 2.

The replaceable lamp module in accordance with the present invention can be positioned and fixed in the backlight module without increasing additional space of the backlight module. Furthermore, the backlight module having replaceable lamp module according to the present invention is capable of reducing the probability of Hi-Pot test failure without attaching additional elements.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A backlight module having replaceable lamp module comprising:
   a frame comprising a bottom surface and four sides;
   a light-guiding plate disposed over the bottom surface among four sides of the frame, wherein one side of the light-guiding plate and a corresponding side of the frame form a sliding groove;
   a replaceable lamp module, set in and slidably along the sliding groove, comprising:
      a lamp, having two electrodes respectively on two opposite ends of the lamp;
      a first bushing and a second bushing, enveloping the two electrodes respectively; and
      a reflecting plate, carrying the first and second bushings and enclosing a part of the lamp, wherein a surface of the reflecting plate supports the lamp; and
   a positioning and protecting mechanism, comprising:
      a protecting device, protruded downwards from the surface of the reflecting plate and set on two opposite sides of the reflecting plate; and
      a positioning device, set on the frame and corresponding to the position of the protecting device, wherein the protecting device and the positioning device are coupled to each other for positioning the replaceable lamp module to a predetermined position in the sliding groove while inserting the replaceable lamp module.

2. The backlight module of claim 1, further comprising a fixed tape for fixing a lead wire of the replaceable lamp module, wherein the fixed tape is attached to the outside of the reflecting plate.

3. The backlight module of claim 2, wherein the protecting device is protruded to the outside of the fixed tape.

4. The backlight module of claim 3, wherein the protecting device has a thickness greater than the thickness of the fixed tape.

5. The backlight module of claim 3, wherein the protecting device comprises a first protrusion and a second protrusion, respectively protruded from two longitudinally opposite sides of the reflecting plate.

6. The backlight module of claim 5, wherein the positioning device comprises a first indentation and a second indentation, respectively corresponding to the first protrusion and the second protrusion.

7. The backlight module of claim 6, wherein the sliding groove is formed with a push-in structure set on the inner side of the sliding groove over the first indentation.

8. The backlight module of claim 7, wherein the push-in structure is used for pressing the first bushing downward when the replaceable lamp module is inserting in the sliding groove and approaching the first indentation.

9. The backlight module of claim 7, wherein the push-in structure is a slope structure.

10. The backlight module of claim 6, wherein the first and second indentations comprise holes or openings.

11. The backlight module of claim 1, wherein the first and second bushings are made of rubber or other elastic materials.

12. A backlight module having replaceable lamp module comprising:
   a frame comprising a bottom surface and four sides;
   a light-guiding plate disposed over the bottom surface among four sides of the frame, wherein one side of the light-guiding plate and a corresponding side of the frame form a sliding groove;
   a replaceable lamp module, set in and slidably along the sliding groove, comprising:
      a lamp, having two electrodes respectively on two opposite ends of the lamp;
      a first bushing and a second bushing, enveloping the two electrodes respectively; and
      a reflecting plate, carrying the first and second bushings and enclosing a part of the lamp; and
   a positioning and protecting mechanism, comprising:
      a protecting device, set on two opposite sides of the reflecting plate and protruded from the opposite sides of the reflecting plate, wherein the protecting device forms a gap between the replaceable lamp module and a bottom of the sliding groove to protect the replaceable lamp module from being scraped by the backlight module while the replaceable lamp module is being inserted into the sliding groove; and
   a positioning device, set on the frame and corresponding to the position of the protecting device, wherein the protecting device and the positioning device are coupled to each other for positioning the replaceable lamp module to a predetermined position in the sliding groove while inserting the replaceable lamp module.

* * * * *